(12) United States Patent
Goh et al.

(10) Patent No.: US 7,282,300 B2
(45) Date of Patent: Oct. 16, 2007

(54) LITHIUM SECONDARY BATTERY COMPRISING OVERDISCHARGE-PREVENTING AGENT

(75) Inventors: Eun-Young Goh, Goyang (KR); Seung-Tae Hong, Daejeon (KR); Hyoung-Jin Kim, Daejeon (KR); Hyung-Keun Lee, Daejeon (KR)

(73) Assignee: LG Chem, Ltd. (KR)

(*) Notice: Subject to any disclaimer, the term of this patent is extended or adjusted under 35 U.S.C. 154(b) by 491 days.

(21) Appl. No.: 10/478,802

(22) PCT Filed: Dec. 2, 2002

(86) PCT No.: PCT/KR02/02267

§ 371 (c)(1), (2), (4) Date: Nov. 25, 2003

(87) PCT Pub. No.: WO03/081697

PCT Pub. Date: Oct. 2, 2003

(65) Prior Publication Data

US 2004/0157124 A1    Aug. 12, 2004

(30) Foreign Application Priority Data

Mar. 22, 2002 (KR) ............ 10-2002-0015713
Jun. 27, 2002 (KR) ............ 10-2002-0036438

(51) Int. Cl.
H01M 4/58 (2006.01)
H01M 4/50 (2006.01)
H01M 4/88 (2006.01)

(52) U.S. Cl. ............ 429/231.1; 429/231.95; 429/231.3; 429/221; 429/231.6; 429/224; 252/182.1

(58) Field of Classification Search ............ 429/231.1, 429/223, 220, 231.2, 231.95, 231.6, 221, 429/222, 224, 229, 331, 332; 252/182.1
See application file for complete search history.

(56) References Cited

U.S. PATENT DOCUMENTS 5,759,719 A  6/1998 Mao ............ 429/223

2005/0130044 A1 * 6/2005 Aoshima et al. ............ 429/324

FOREIGN PATENT DOCUMENTS

| CN | 1206501 A | 1/1999 |
| EP | 0 935 302 A1 | 8/1999 |
| JP | 06-342673 | 12/1994 |
| JP | 7-235291 | 9/1995 |
| JP | 10-208730 | 8/1998 |
| JP | 2000-077071 | 3/2000 |
| JP | 2000-502831 | 3/2000 |
| JP | 2000-113908 | 4/2000 |
| JP | 2000-149996 | 5/2000 |
| JP | 2001-243943 | 9/2001 |

OTHER PUBLICATIONS

PCT International Search Report; International application No. PCT/KR02/02267; International filing date: Dec. 2, 2002; Date of Mailing: Mar. 26, 2003.

Notification of the First Office Action dated Mar. 4, 2005 issued by Patent Office of the People's Republic of China for Application No. 02812484.7.

* cited by examiner

*Primary Examiner*—Raymond Alejandro
(74) *Attorney, Agent, or Firm*—Cantor Colburn LLP

(57) ABSTRACT

The present invention relates to a lithium secondary battery comprising an overdischarge-preventing agent. Particularly, the present invention provides a lithium secondary battery comprising an overdischarge-preventing agent having superior effects for an overdischarge test and showing 90% or more capacity recovery after the test, by introducing lithium nickel oxide into a cathode for a lithium secondary battery comprising a lithium transition metal oxide capable of occluding and releasing lithium ions as an overdischarge-preventing agent to supply lithium ions such that irreversible capacity of an anode can be compensated or better, thereby lowering voltage of a cathode first to prevent voltage increase of an anode during the overdischarge test.

10 Claims, 6 Drawing Sheets

LITHIUM SECONDARY BATTERY COMPRISING OVERDISCHARGE-PREVENTING AGENT

BACKGROUND OF THE INVENTION (a) Field of the Invention

The present invention relates to a lithium secondary battery comprising an overdischarge-preventing agent, and more particularly to a lithium secondary battery that uses lithium nickel oxide as an overdischarge-preventing agent and thus has superior overdischarge effects.

(b) Description of the Related Art

Recently, development of mobile telecommunication and information electronics industries has continuously increased demand for lithium secondary batteries that have a light weight but a high capacity. Conventional lithium secondary batteries are equipped with protection circuits for reasons such as overcharge prevention and overdischarge prevention, etc. However, since conventional lithium secondary batteries are equipped with PTC or thermal fuses and protection circuits for safety of batteries, they are not preferable in terms of cost or volume and weight of battery packs. Accordingly, there is a need for development of novel batteries without protection circuits.

However, in cases so far known of bare cells without protection circuits, if they are charged-discharged after an overdischarge test, capacity rapidly decreases.

Since first cycle irreversible capacity of an anode is larger than that of a cathode in present battery systems, if a battery is continuously discharged with low current or constant resistance to a cell voltage of 0V to result in overdischarge, voltage of an anode that has a larger irreversible capacity increases first. In such a case, if the voltage of an anode reaches a specific voltage area of approximately 3.6V or more when an anode collector copper foil is oxidized, in the case of pouch-shaped, square-shaped, or cylindrical batteries, the cell is damaged due to copper ion dissolution, etc., and thus after overdischarge, charge-discharge does not properly proceed. Therefore, there is a need for development of a novel method for solving this overdischarge problem.

Meanwhile, U.S. Pat. No. 5,759,719 has attempted to show a battery capacity increase by adding $Li_2NiO_2$ that has a low electrochemical potential (vs. Li) to cathode active material $LiNiO_2$ to give a 3V plateau.

SUMMARY OF THE INVENTION

The present invention is made in consideration of the problems of the prior art, and it is an object of the present invention to provide a cathode for a lithium secondary battery that can greatly improve overdischarge effects without inhibiting various performance factors of a battery, by adding lithium nickel oxide to a cathode comprising a cathode active material, as an overdischarge-preventing agent.

It is another object of the present invention to provide a lithium secondary battery comprising the cathode.

In order to achieve these objects, the present invention provides a cathode for a lithium secondary battery comprising a lithium transition metal oxide that can occlude and release lithium ions, wherein the cathode comprises 0.1 to 10 weight parts of an overdischarge-preventing agent represented by the following Chemical Formula 1, on the basis of 100 weight parts of cathode active material:

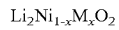  [Chemical Formula 1]

$Li_2Ni_{1-x}M_xO_2$ (wherein $0 \leq x < 1$, and M is a metal selected from the group consisting of Mn, Fe, Co, Cu, Zn, Mg, and Cd.)

The present invention also provides a lithium secondary battery comprising a) a cathode comprising a lithium transition metal oxide that can occlude and release lithium ions; b) an anode comprising carbon, lithium metal, or an alloy that can occlude and release lithium ions; c) a separator film; and d) a non-aqueous electrolyte comprising i) a lithium salt and ii) an electrolytic compound, Wherein the cathode comprises 0.1 to 10 weight parts of an overdischarge-preventing agent represented by the above Chemical Formula 1, on the basis of 100 weight parts of cathode active material.

More particularly, the overdischarge-preventing agent is preferably $Li_2NiO_2$.

BRIEF DESCRIPTION OF THE DRAWINGS

FIG. 11b shows a side view of the cross-section of the three electrode bicell of FIG. 11a.

Figure 1:
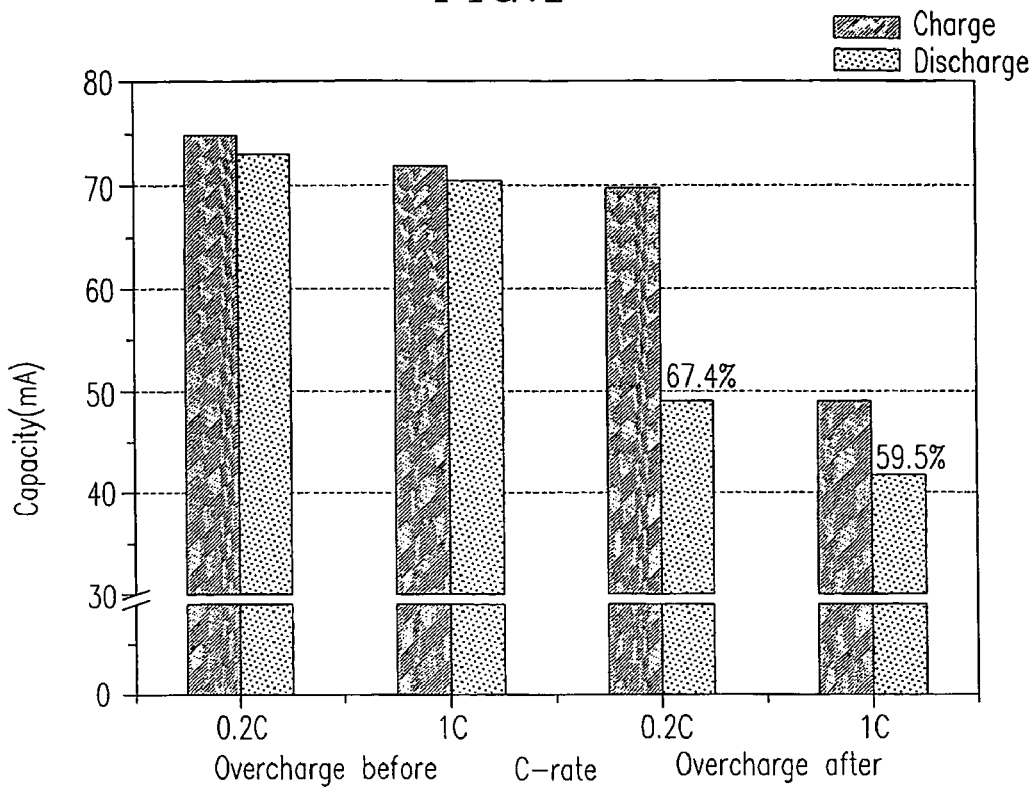
FIG. 1 shows results of charge-discharge tests at 0.2 C and 1.0 C before and after overdischarge according to Comparative Example 1.

Reference numeral 1 is an aluminium pouch, 2 is a lid, 3 is a cathode, 4 is an anode, 5 is a cathode current collector, 6 is an anode current collector, 7 is a separator film, 8 is lithium metal, and 9 is an electrolyte.

DETAILED DESCRIPTION AND THE PREFERRED EMBODIMENTS

The present invention will now be explained in detail.

The present invention is based on the discovery that if lithium nickel oxide is used as an overdischarge-preventing agent in an appropriate amount, it can control irreversible capacities of a cathode, therefore showing superior effects for the overdischarge property without decreasing battery capacity.

The lithium secondary battery of the present invention comprises a cathode that can occlude and release lithium ions, an anode that can occlude and release lithium ions, a porous separator film, and an electrolyte.

The present invention is characterized in that the overdischarge-preventing agent of the above Chemical Formula 1 is used as an overdischarge-preventing agent of a cathode together with a cathode active material to control irreversible capacities of a cathode, thereby contributing to capacity recovery of 90% or more after overdischarge test without decreasing battery capacity. The overdischarge-preventing agent of the above Chemical Formula 1 is a material that can release 1 mole or more of lithium ions at the charge of the first cycle, and that can occlude and release 1 mole or less of lithium ions from the discharge of the first cycle to the next cycle. Therefore, if the overdischarge-preventing agent is added to a cathode, lithium ions are provided such that the irreversible capacity of an anode can be compensated or better and thus a large irreversible capacity of an anode at the first cycle can be reduced.

More specifically, if overdischarge occurs, voltage of an anode that has a large irreversible capacity increases, then copper ion dissolution occurs and thus charge-discharge does not properly proceed. In order to prevent an increase in voltage of an anode at overdischarge test, irreversible capacity of a cathode must increase to make the cathode voltage decrease first. For this, as shown in the present invention, a material with a large irreversible capacity and having a Li-source is added to the cathode to make the cathode irreversible capacity large.

The compound of the above Chemical Formula 1 belongs to the space group Immm, wherein a Ni and M composite oxide forms square planar coordination units (Ni, M)$O_4$ and this (Ni, M)$O_4$ square planar coordination shares their opposite sides to form a layered structure. Thus the oxidation number of Ni or M becomes +2 to +4 at charge-discharge, and during charge-discharge, Li ions are released and inserted and thus the $Li_2Ni_{1-x}M_xO_2$ structure has the nominal composition of $Li_{2-z}Ni_{1-x}M_xO_2$ ($0 \leq x<1$, $0 \leq z<2$).

In addition, according to the present invention, the compound of the above Chemical Formula 1 is added to a cathode so that the irreversible capacity of an anode can be compensated, therefore showing superior performance in an overdischarge test of safe cell that has been recently required in the industry. Since the importance of safe cell tends to increase, the compound of Chemical Formula 1 is added to show a superior overdischarge property. In the present invention, the overdischarge-preventing agent of Chemical Formula 1 is preferably $Li_2NiO_2$.

The overdischarge-preventing agent of Chemical Formula 1 is preferably used in an amount of 0.1 to 10 weight parts per 100 weight parts of cathode active material. If the content of the overdischarge-preventing agent is less than 0.1 weight parts, during an overdischarge test, the anode voltage rises before the cathode voltage drops. If the anode voltage reaches a specific voltage area of 3.6 V or more when an anode current collector copper foil is oxidized, in the case of pouch shaped, square shaped, or cylindrical batteries, the copper foil dissolution occurs, which causes damage to the cell and thus after overdischarge occurs, charge-discharge does not properly proceed. Additionally, if the content exceeds 10 weight parts, even though there are large effects during the overdischarge test because the cathode voltage drops first, $Li_2NiO_2$ is excessively added and thus the cycle life property of the battery may be deteriorated. In addition, after the first cycle charge, $Li_2NiO_2$ has phase transition to $LiNiO_2$, and generally, $LiNiO_2$ is inferior to $LiCoO_2$ in terms of safety, so it is not preferable to excessively add $Li_2NiO_2$ to cathode materials.

The cathode active material used in the present invention is preferably lithium containing transition metal oxide, and for examples, it is selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, $LiFePO_4$, and a mixture thereof, and $LiCoO_2$ is preferable.

In addition, as an anode active material, a carbonaceous material such as graphite, carbon, lithium metal, an alloy thereof, etc. that can occlude and release lithium ions can be used, and preferably artificial graphite is used. The anode may comprise a binder, preferably PVDF or SBR.

As the separator film, a porous separator film is preferably used, and polypropylene, polyethylene, or polyolefin porous separator films are examples thereof, but the present invention is not limited to them.

The non-aqueous electrolyte may comprise a cyclic carbonate and a linear carbonate as the electrolytic compound. Examples of the cyclic carbonate include ethylene carbonate (EC), propylene carbonate (PC), γ-butyrolactone (GBL), etc. The linear carbonate is preferably selected from the group consisting of diethyl carbonate (DEC), dimethylcarbonate (DMC), ethylmethylcarbonate (EMC), methylpropyl carbonate (MPC), and a mixture thereof. Additionally, the non-aqueous electrolyte comprises a lithium salt together with the carbonate compound, which is preferably selected from the group consisting of $LiClO_4$, $LiCF_3SO_3$, $LiPF_6$, $LiBF_4$, $LiAsF_6$, $LiN(CF_3SO_2)_2$, and a mixture thereof.

The lithium secondary battery is prepared according to the common method by inserting a porous separator film between a cathode and an anode, and introducing a non-aqueous electrolyte therein.

The lithium secondary battery according to the present invention is preferably cylindrical, square, or pouch-shaped.

As explained, according to the present invention, the compound of the above Chemical Formula 1 (preferably $Li_2NiO_2$) is added to a cathode of a battery comprising an anode active material with an irreversible capacity of 30% or less as an overdischarge-preventing agent, and thus capacity recovery of 90% or more can be realized even after an overdischarge test, and the battery capacity does not decrease.

The present invention will be explained in more detail with reference to the following Examples. However, these are to illustrate the present invention and the present invention is not limited to them.

EXAMPLE

Example 1

A pouch-type bicell was prepared by a common method. $LiCoO_2$ was used as cathode active material, and on the basis of 100 weight parts of the cathode active material, 2 weight parts of $Li_2NiO_2$ were added as an overdischarge-preventing agent. Specifically, 78.4 wt % of $LiCoO_2$, 1.6 wt % of $Li_2NiO_2$, 10 wt % of KS-6 (conductor), and 10 wt % of PVDF (binder) were added to a solvent NMP to prepare a cathode mixture slurry, and then the slurry was coated on an Al collector to prepare a cathode. Graphite was used as an anode active material, and a 1M $LiPF_6$ and EC/PC/DEC solution was used as an electrolyte to prepare a battery by a common method.

Example 2

A battery was prepared by the same method as in Example 1, except that on the basis of 100 weight parts of cathode active material, 5 weight parts of $Li_2NiO_2$ were used as an overdischarge-preventing agent.

Example 3

A battery was prepared by the same method as in Example 1, except that on the basis of 100 weight parts of cathode active material, 9 weight parts of $Li_2NiO_2$ were used as an overdischarge-preventing agent.

Comparative Example 1

A battery was prepared by the same method as in Example 1, except that an overdischarge-preventing agent ($Li_2NiO_2$) was not used in the cathode.

Comparative Example 2

A battery was prepared by the same method as in Example 1, except that on the basis of 100 weight parts of cathode active material, 15 weight parts of $Li_2NiO_2$ were used as an overdischarge-preventing agent.

Experiment 1

Figure 2:
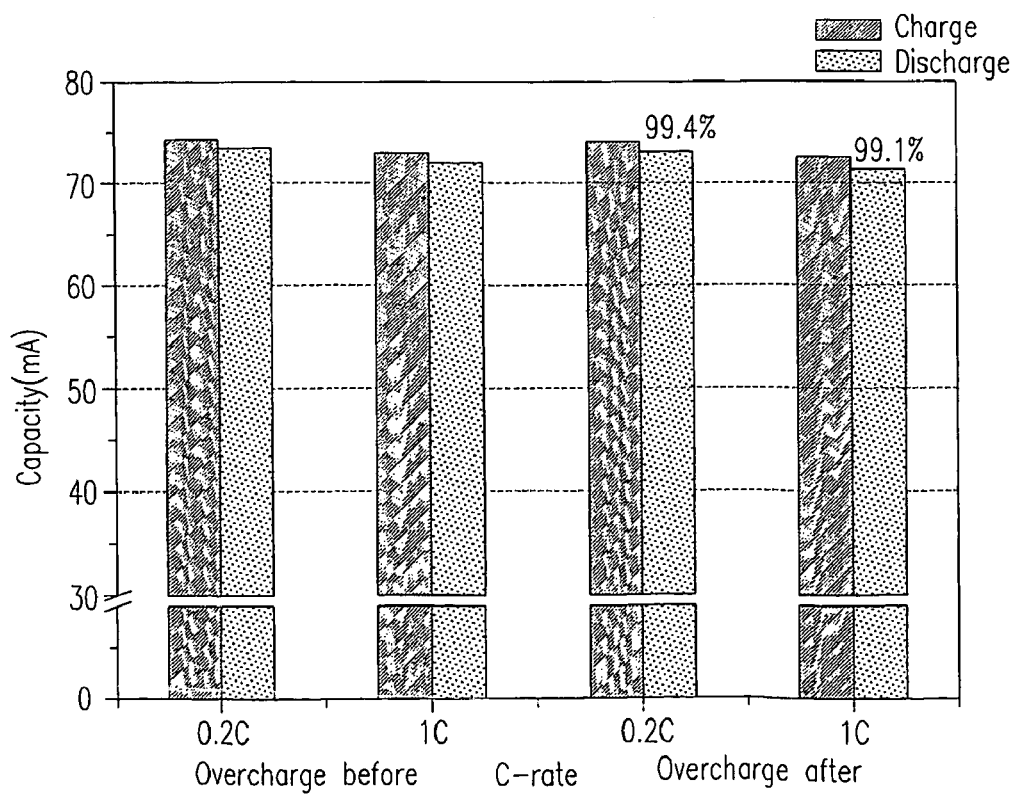
FIG. 2 shows results of charge-discharge tests at 0.2 C and 1.0 C before and after overdischarge according to Example 1 of the present invention.
Figure 3:
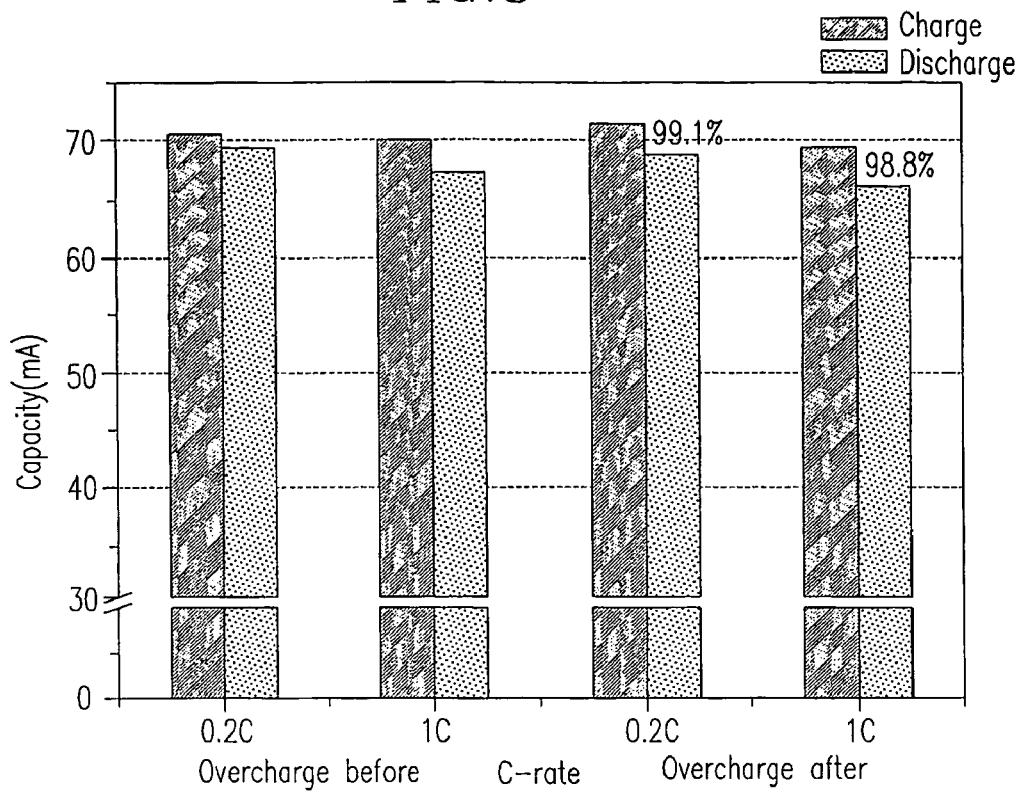
FIG. 3 shows results of charge-discharge tests at 0.2 C and 1.0 C before and after overdischarge according to Example 2 of the present invention.
Figure 4:
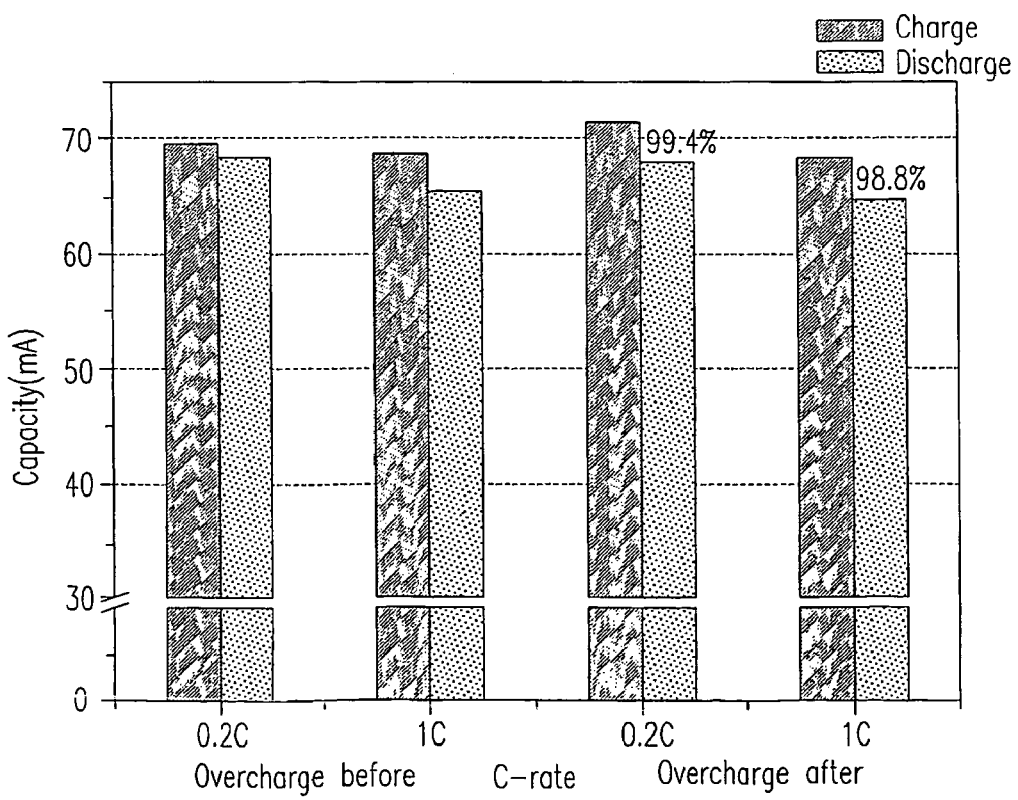
FIG. 4 shows results of charge-discharge tests at 0.2 C and 1.0 C before and after overdischarge according to Example 3 of the present invention.

For the pouch-type bicells prepared in Examples 1 to 3 and Comparative Example 1, charge capacities and discharge capacities before and after overdischarge test were measured by common methods, and the results of the overdischarge test are shown in FIG. 1 (Comparative Example 1), FIG. 2 (Example 1), FIG. 3 (Example 2), and FIG. 4 (Example 3). The numbers respectively indicate 0.2 C and 1 C discharge capacity recovery rates after overdischarge test for 0.2 C and 1 C discharge capacities before overdischarge test. As shown in FIGS. 1 to 4, Examples 1 to 3 of the present invention show capacity recovery rates of 90% or more after the overdischarge test compared to Comparative Example 1.

Experiment 2

For bicells of Examples 1 to 3 and Comparative Example 1, 3-electrode tests were conducted, and the results are respectively shown in FIGS. 5 to 8. Generally, when evaluating battery properties, two-electrode or three-electrode cell is used. The two-electrode cell is comprised of two electrodes of a cathode and an anode to describe a voltage difference between the cathode and the anode, and that is called full cell voltage. The three-electrode is a battery system in which lithium metal is inserted into a battery in addition to a cathode and an anode so that a voltage difference between a reference electrode (lithium metal) and the cathode and a voltage difference between a reference electrode (lithium metal) and the anode can be respectively measured to examine how the cathode and the anode perform for the reference electrode in a practical battery at charge-discharge, and that is called group cell voltage.

Figure 5:
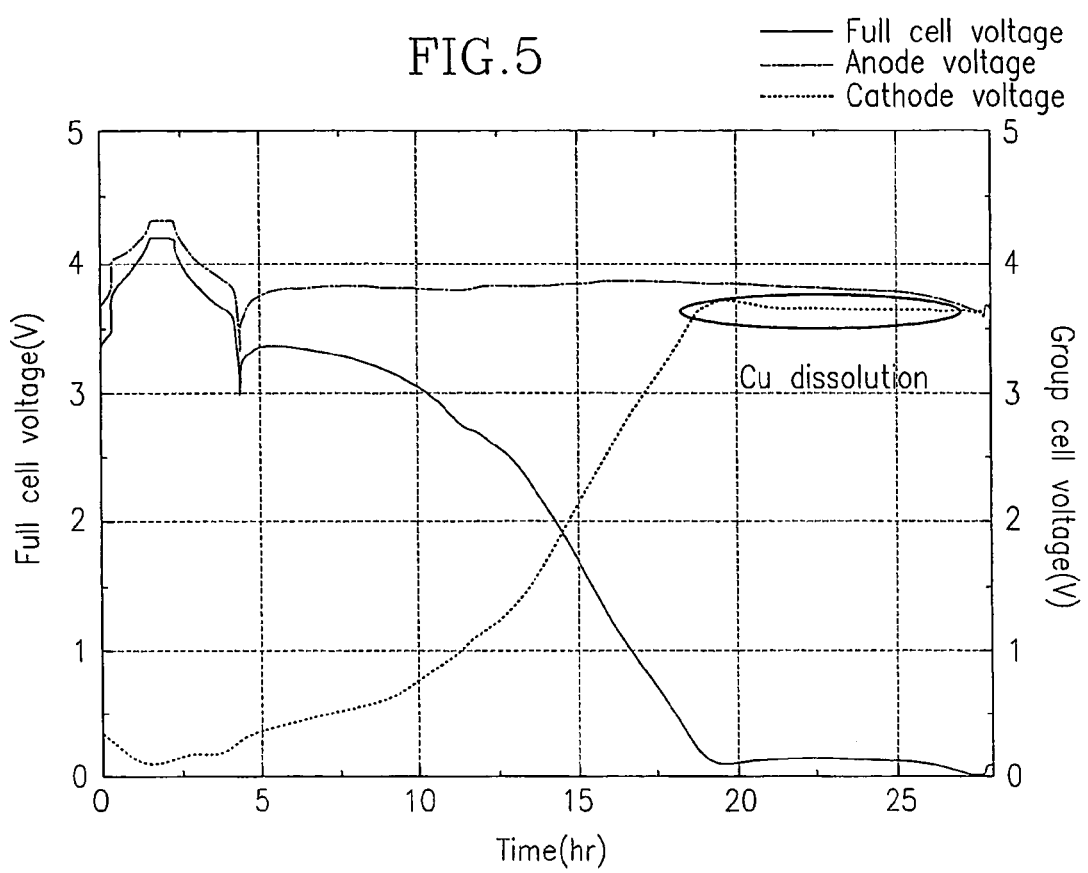
FIG. 5 shows test results of a three electrode bicell of Comparative Example 1.

In FIG. 5, in the case of Comparative Example 1, voltage of an anode increases during an overdischarge test to show a plateau in which copper ions dissolutions occur as indicated by a circle.

Figure 6:
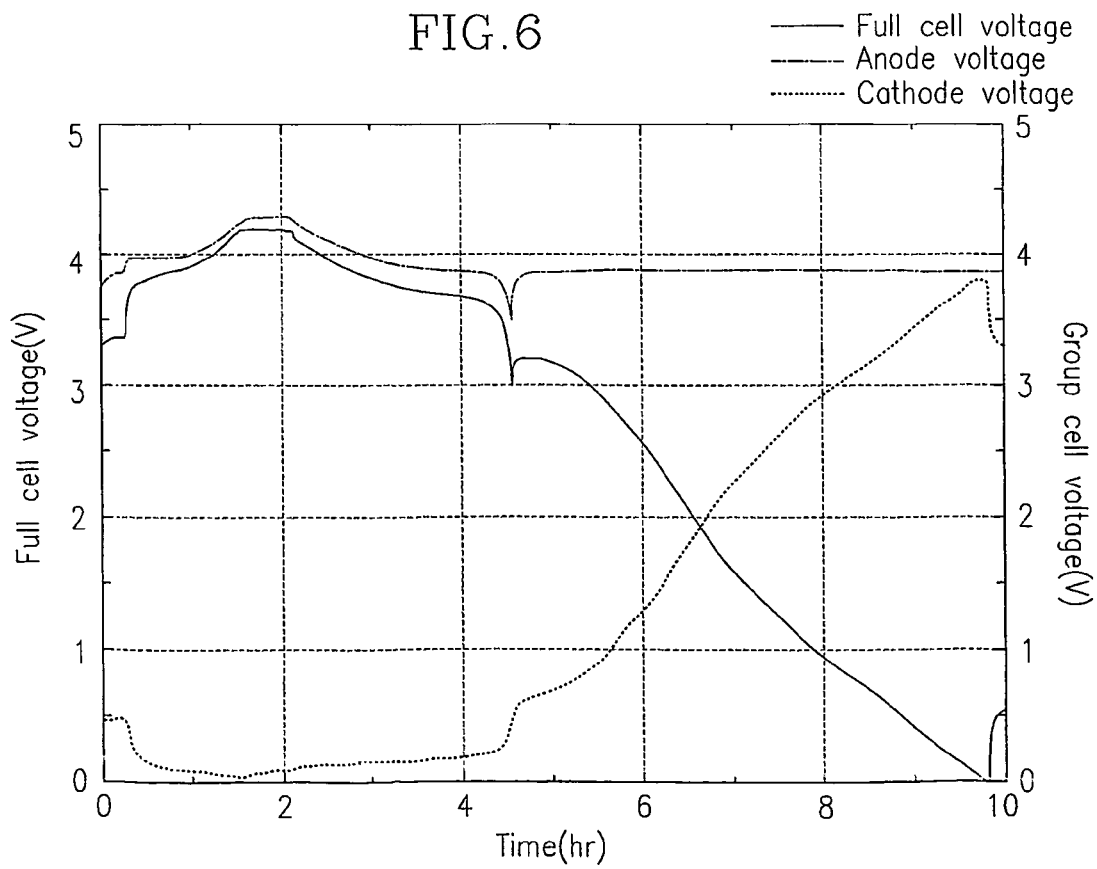
FIG. 6 shows test results of a three electrode bicell of Example 1 according to the present invention.
Figure 7:
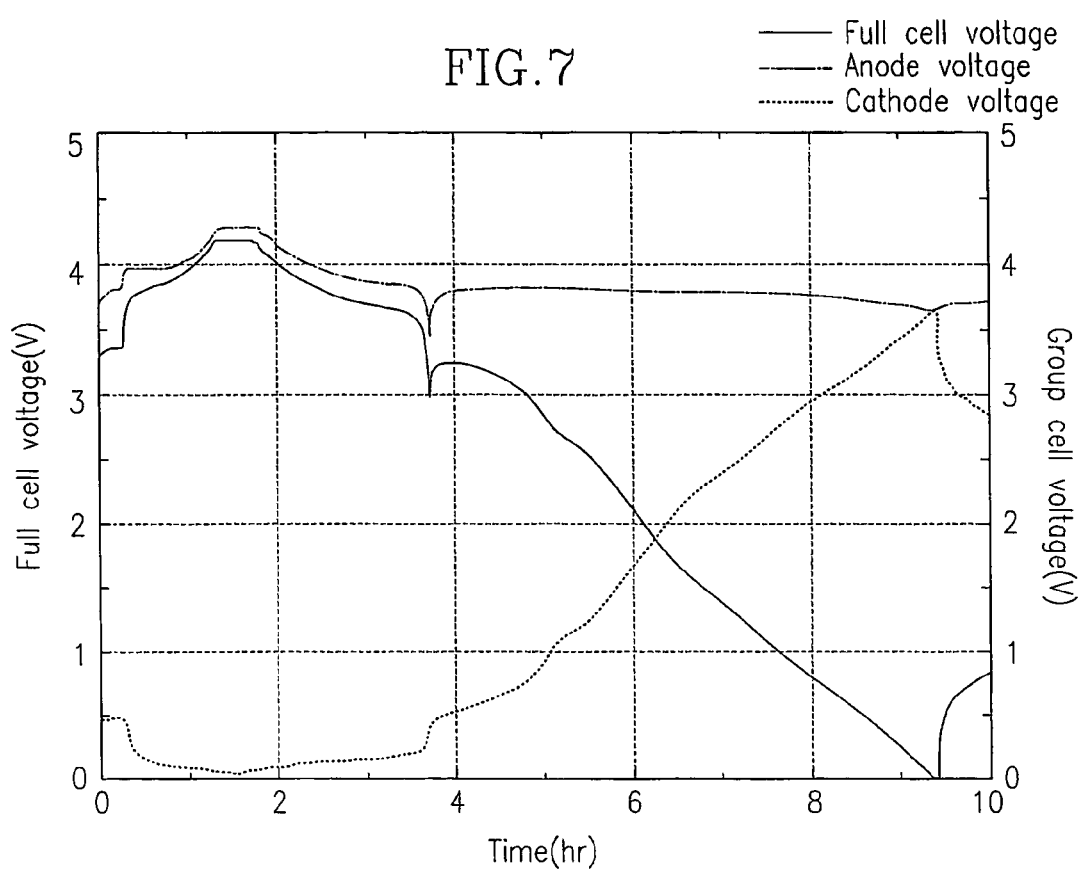
FIG. 7 shows test results of a three electrode bicell of Example 2 according to the present invention.
Figure 8:
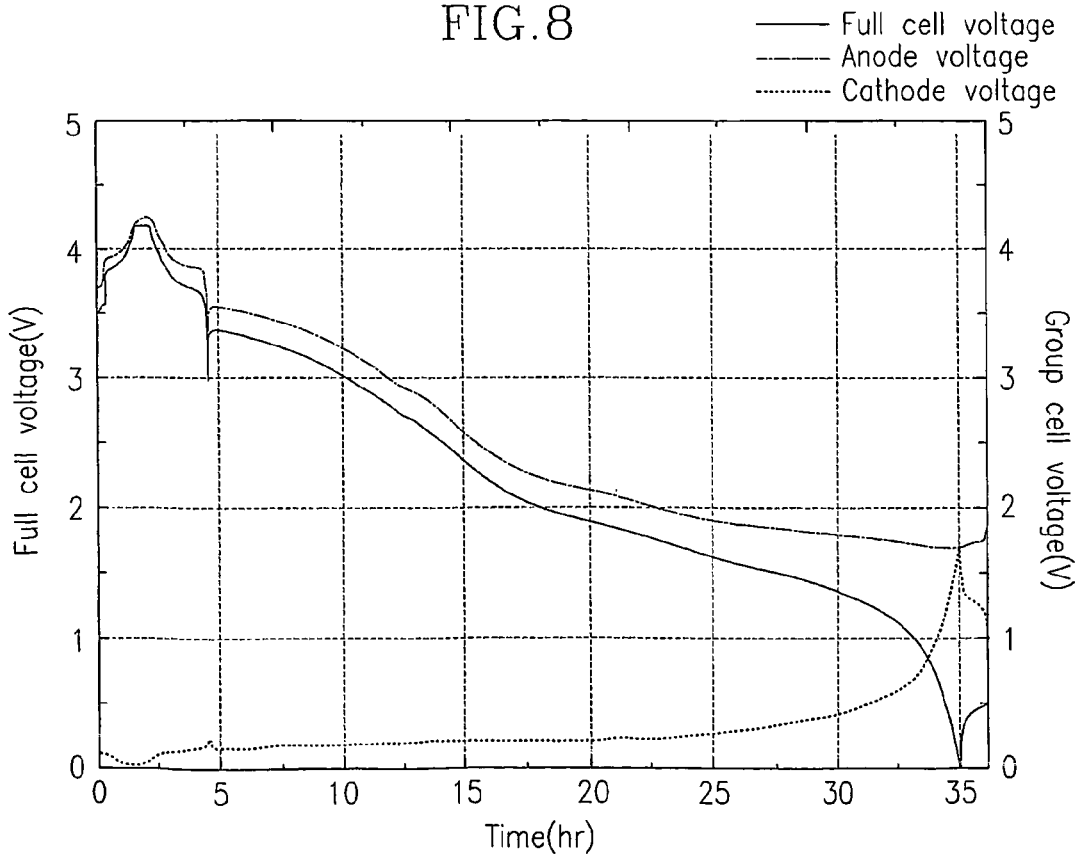
FIG. 8 shows test results of a three electrode bicell of Example 3 according to the present invention.

Meanwhile, in the case of Examples 1 to 3 of FIGS. 6 to 8, it can be seen that a plateau wherein copper ions dissolution occur does not appear.

Experiment 3

Figure 9:
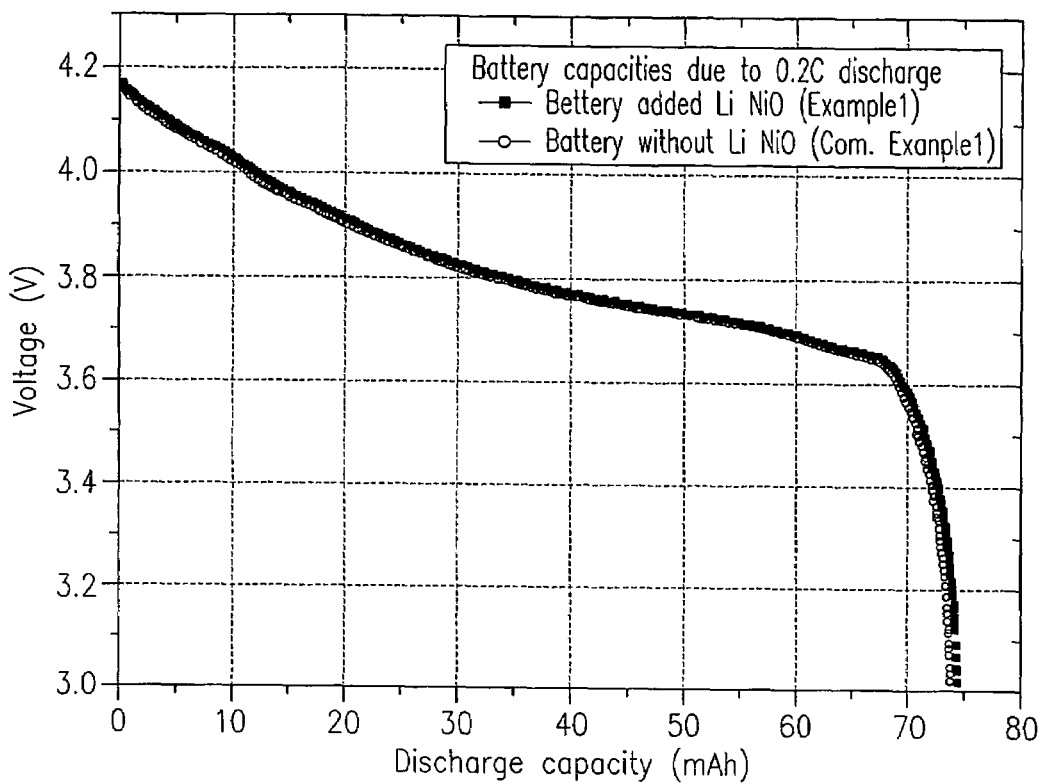
FIG. 9 shows results of tests of battery capacities due to 0.2 C discharge of Example 1 according to the present invention and Comparative Example 1 according to the prior art.

For Example 1 and Comparative Example 1, battery capacity tests at a 0.2 C discharge rate were conducted, and the results are shown in FIG. 9. As shown in FIG. 9, in Example 1 the battery capacity did not decrease compared to Comparative Example 1.

Experiment 4

Figure 10:
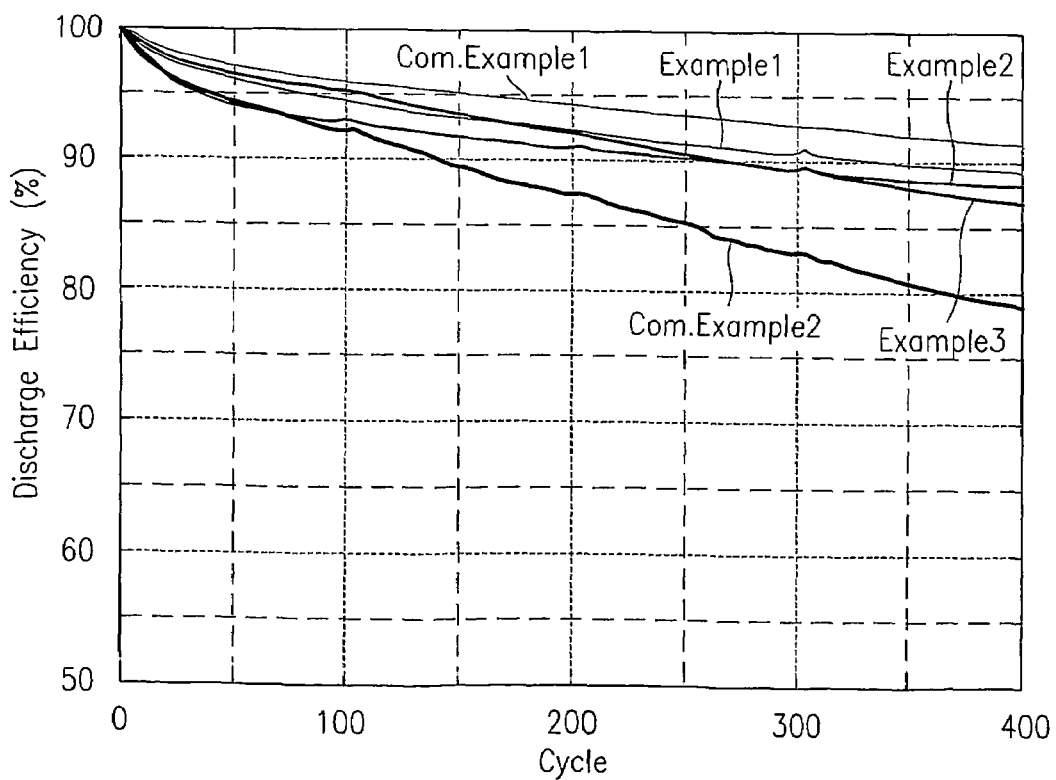
FIG. 10 shows cycle lifes of Comparative Example 1, Comparative Example 2, and Examples 1 to 3 of the present invention.
Figure 11A:
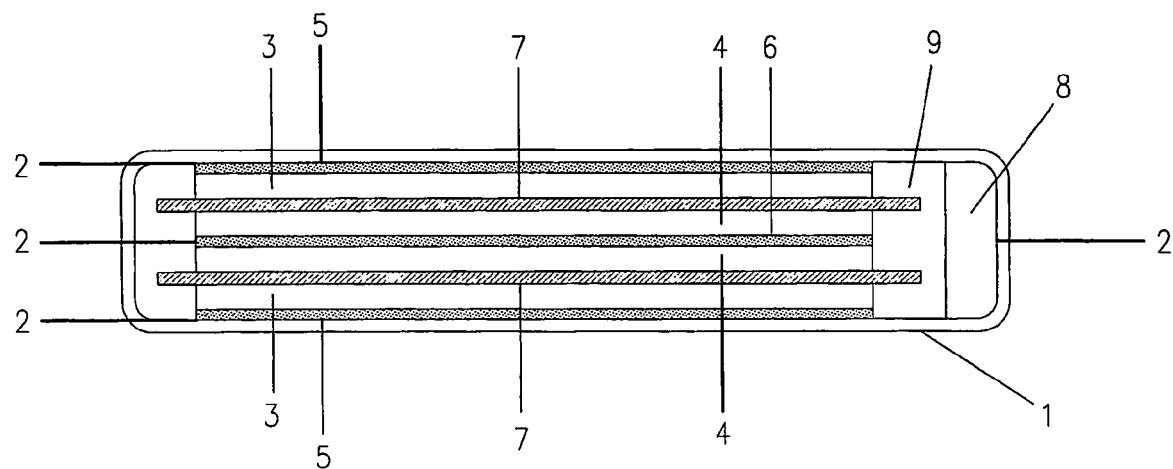
FIG. 11a shows a cross-sectional view of a three electrode bicell.
Figure 11B:
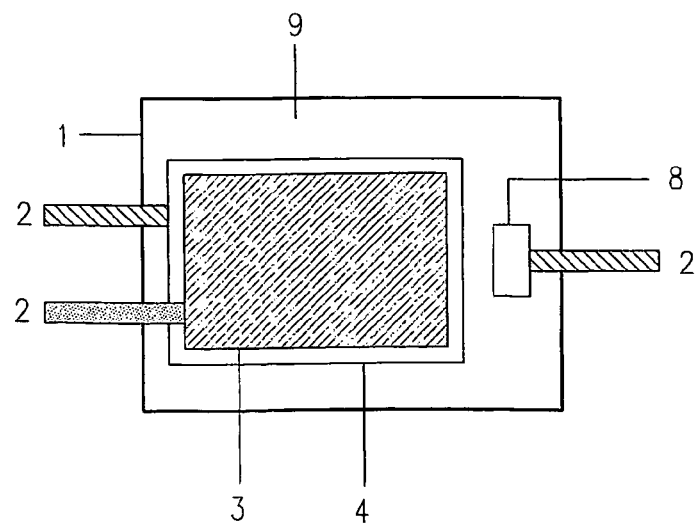

For bicells of Comparative Examples 1 and 2 and Examples 1 to 3, cycle lifes were measured and the results are shown in FIG. 10. As shown in FIG. 10, the bicell of Comparative Example 2 in which 10 weight parts or more, specifically 15 weight parts, of $Li_2NiO_2$ were added showed a rapid decrease in cycle performance after 100 cycles.

Therefore, according to the present invention, $Li_2NiO_2$ that has a large irreversible capacity at the first cycle was added in an appropriate amount to control irreversible capacities of a cathode, thereby preventing a voltage increase of the anode in an overdischarge test, and thus capacity does not significantly decrease even after the overdischarge test.

As explained, the present invention introduces a controlled amount of a compound of the above Chemical Formula 1 (preferably $Li_2NiO_2$) as an overdischarge-preventing agent in a cathode to provide lithium ions such that the overdischarge-preventing agent can compensate irreversible capacity of an anode or greater, thereby particularly preventing a voltage increase of an anode in an overdischarge test, and thereby providing a lithium secondary battery showing 90% or more of capacity recovery after the test.

What is claimed is:

1. A cathode for a lithium secondary battery comprising 2 to 9 weight parts of an overdischarge-preventing agent represented by the following Chemical Formula 1 and having square planar coordination units, on the basis of 100 weight parts of a cathode active material:

$Li_2Ni_{1-x}M_xO_2$ 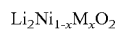 [Chemical Formula 1]

wherein, $0 \leq x < 1$, and M is a metal selected from the group consisting of Mn, Fe, Co, Cu, Zn, Mg, and Cd.

2. The cathode for a lithium secondary battery according to claim 1, wherein the overdischarge-preventing agent represented by the Chemical Formula 1 is $Li_2NiO_2$.

3. The cathode for a lithium secondary battery according to claim 1, wherein the cathode active material comprises a lithium transition metal oxide selected from the group consisting of $LiCoO_2$, $LiNiO_2$, $LiMnO_2$, $LiMn_2O_4$, $Li(Ni_aCo_bMn_c)O_2$, $LiNi_{1-y}Co_yO_2$, $LiCo_{1-y}Mn_yO_2$, $LiNi_{1-y}Mn_yO_2$, $Li(Ni_aCo_bMn_c)O_4$, $LiMn_{2-z}Ni_zO_4$, $LiMn_{2-z}Co_zO_4$, $LiCoPO_4$, $LiFePO_4$, and a mixture thereof, wherein $0<a<1$, $0<b<1$, $0<c<1$, $a+b+c=1$, $0<a'<2$, $0<'<2$, $0<c'<2$, $a'+b'+c'=2$, $0 \leq y < 1$, and $0<z<2$.

4. A lithium secondary battery, comprising:
   a) a cathode comprising 2 to 9 weight parts of overdischarge-preventing agent represented by the following Chemical Formula 1 and having square planar coordination units, on the basis of 100 weight parts of a cathode active material:

$Li_2Ni_{1-x}M_xO2$ 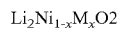 [Chemical Formula 1]

wherein $0 \leq x < 1$, and M is a metal selected from the group consisting of Mn, Fe, Co, Cu, Zn, Mg, and Cd;
   b) an anode comprising carbon, a lithium metal, or an alloy capable of occluding and releasing lithium ions;

c) a separator film; and d) a non-aqueous electrolyte comprising i) a lithium salt and ii) an electrolytic compound.

5. The lithium secondary battery according to claim 4, wherein the overdischarge-preventing agent represented by the Chemical Formula 1 is $Li_2NiO_2$.

6. The lithium secondary battery according to claim 4, wherein the cathode active material comprises a lithium transition metal oxide selected from the group consisting of $LiCoO_2$, $LiNiO_2$, $LiMnO_2$, $LiMn_2O_4$, $Li(Ni_aCo_bMn_c)O_2$, $LiNi_{1-y}Co_yO_2$, $LiCo_{1-y}Mn_yO_2$, $LiNi_{1-y}Mn_yO_2$, $Li(Ni_aCo_bMn_{c'})O_4$, $LiMn_{2-z}Ni_zO_4$, $LiMn_{2-z}Co_zO_4$, $LiCoPO_4$, $LiFePO_4$, and a mixture thereof, wherein $0<a<1$, $0<b<1$, $0<c<1$, $a+b+c=1$, $0<a'<2$, $0<b'<2$, $0<c'<2$, $a'+b'+c'=2$, $0\leq y<1$, and $0<z<2$.

7. The lithium secondary battery according to claim 4, wherein the lithium salt of step d) is selected from the group consisting of $LiClO_4$, $LiCF_3SO_3$, $LiPF_6$, $LiBF_4$, $LiAsF_6$, $LiN(CF_3SO_2)_2$, and a mixture thereof.

8. The lithium secondary battery according to claim 4, wherein the electrolytic compound of step d) comprises a cyclic carbonate selected from the group consisting of ethylene carbonate, propylene carbonate, γ-butyrolactone, and a mixture thereof; and a linear carbonate selected from the group consisting of diethyl carbonate, dimethyl carbonate, ethylmethylcarbonate, methylpropyl carbonate, and a mixture thereof.

9. The lithium secondary battery according to claim 4, wherein the lithium secondary battery is cylindrical, square-shaped or pouch-shaped.

10. The lithium secondary battery according to claim 4, wherein the lithium secondary battery has 90% or more capacity recovery in an overdischarge test.

* * * * *